(12) United States Patent
Pelly

(10) Patent No.: US 6,788,558 B2
(45) Date of Patent: Sep. 7, 2004

(54) PASSIVE COMMON MODE FILTER AND METHOD FOR OPERATING A PASSIVE COMMON MODE FILTER

(75) Inventor: Brian Pelly, Palos Verdes Estates, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/251,724

(22) Filed: Sep. 19, 2002

(65) Prior Publication Data

US 2004/0062064 A1 Apr. 1, 2004

(51) Int. Cl.[7] .............................................. H02M 1/12
(52) U.S. Cl. ..................... 363/40; 323/209; 327/554
(58) Field of Search .......................... 363/39, 40, 41, 363/42, 43, 44, 47; 327/311, 551, 552, 554; 307/105; 323/209

(56) References Cited

U.S. PATENT DOCUMENTS

| | | | | |
|---|---|---|---|---|
| 4,893,070 A | * | 1/1990 | Milberger et al. | .......... 323/270 |
| 5,548,165 A | * | 8/1996 | Mohan et al. | ................ 307/36 |
| 5,621,623 A | * | 4/1997 | Kuriyama et al. | ............ 363/20 |
| 5,831,842 A | * | 11/1998 | Ogasawara et al. | ........... 363/40 |
| 6,151,228 A | * | 11/2000 | Miyazaki et al. | ............. 363/48 |
| 6,459,597 B1 | * | 10/2002 | Igarashi et al. | ............... 363/39 |
| 6,469,485 B2 | * | 10/2002 | Cheng et al. | ............... 323/286 |

* cited by examiner

*Primary Examiner*—Michael Sherry
*Assistant Examiner*—Gary L. Laxton
(74) *Attorney, Agent, or Firm*—Ostrolenk, Faber, Gerb & Soffen, LLP

(57) ABSTRACT

An electromagnetic interference filter for filtering common mode current in an inverter device, the filter comprising: an inductor coupled in a least one power supply line to the inverter device; the inverter device having a ground return line, a capacitor coupled between the inductor and the ground return line; and a controlled switch coupled in series with the capacitor between the inductor and ground return line, and a control unit controlled in accordance with commutations in said inverter device whereby said switch is turned on when common mode current is drawn by said inverter device and turned off when common mode current ceases substantially to be drawn by said inverter device.

26 Claims, 12 Drawing Sheets

CONVENTIONAL PASSIVE COMMON-MODE FILTER

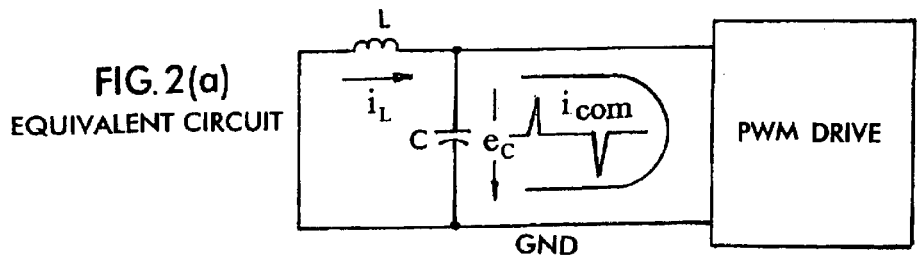
FIG. 2(a) EQUIVALENT CIRCUIT
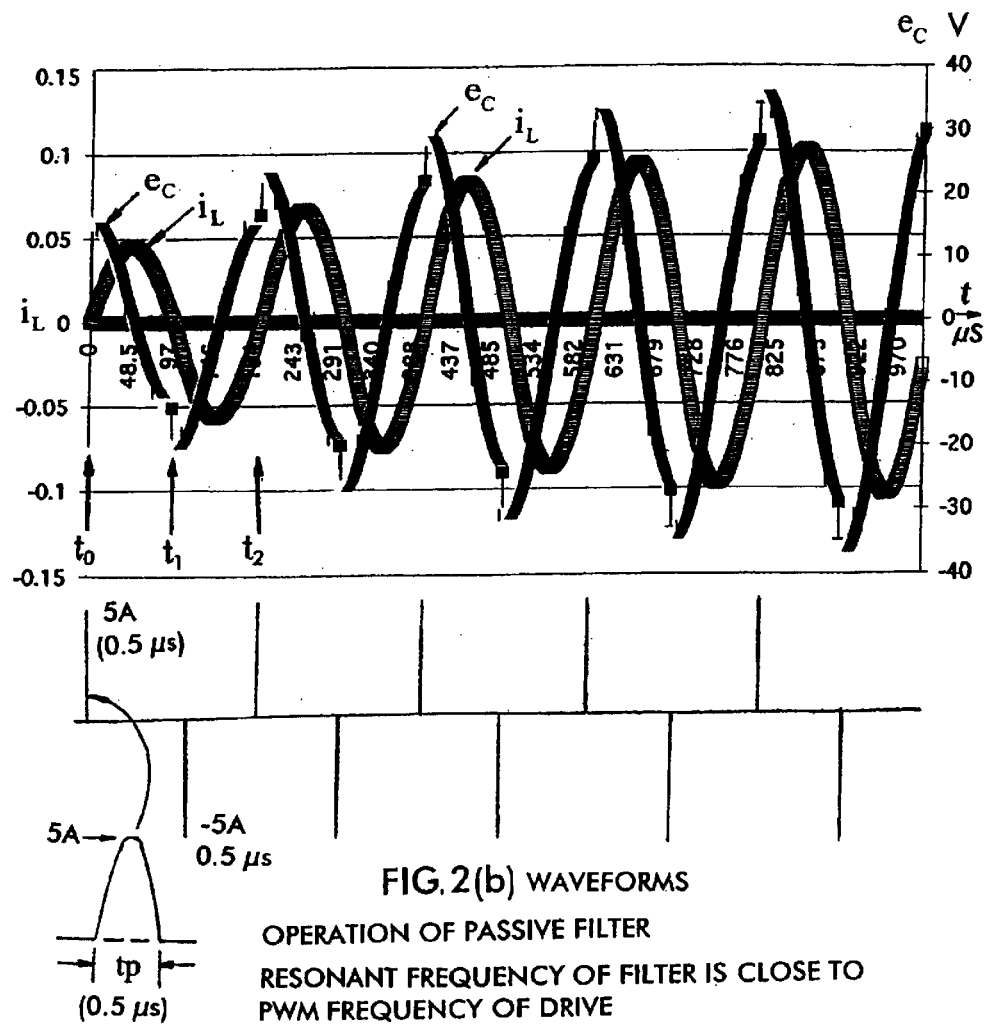
FIG. 2(b) WAVEFORMS
OPERATION OF PASSIVE FILTER
RESONANT FREQUENCY OF FILTER IS CLOSE TO
PWM FREQUENCY OF DRIVE
$I_{COMPK}$ = 5A    tp=0.5us    PWM frequency =5kHz.
L=10.5 mH    C=0.1uF    Q=20

OPERATION OF PASSIVE FILTER

RESONANT FREQUENCY OF FILTER IS ABOUT 0.5 X PWM FREQUENCY $I_{COMPK}$ = 5A    $t_p$=0.5us    PWM frequency =5kHz L= 2mH    C =0.1uF    Q=20

OPERATION OF PASSIVE FILTER

RESONANT FREQUENCY OF FILTER IS ABOUT 0.5 X PWM FREQUENCY $I_{COMPK}$ = 5A  tp=0.5us  PWM frequency =5kHz
L=42mH  C =0.1uF  Q=20

POSSIBLE REALIZATION
OF SWITCH S

COMMON-MODE CURRENT DRAWN BY DRIVE 5A PK, tp = 0.5 μs

VOLTAGE ACROSS INDUCTOR CONVENTIONAL FILTER WITHOUT Y-CAP SWITCH

VOLTAGE ACROSS INDUCTOR FILTER WITH ADDED Y-CAP SWITCH
(NOTE SCALE CHANGE)

SUPERIMPOSED VOLTAGES ACROSS INDUCTOR FILTER
WITH AND WITHOUT ADDED Y-CAP SWITCH $I_{COMPK} = 5A \qquad t_p = 0.5us$
$L = 10.5 mH \qquad C = 0.1 uF$

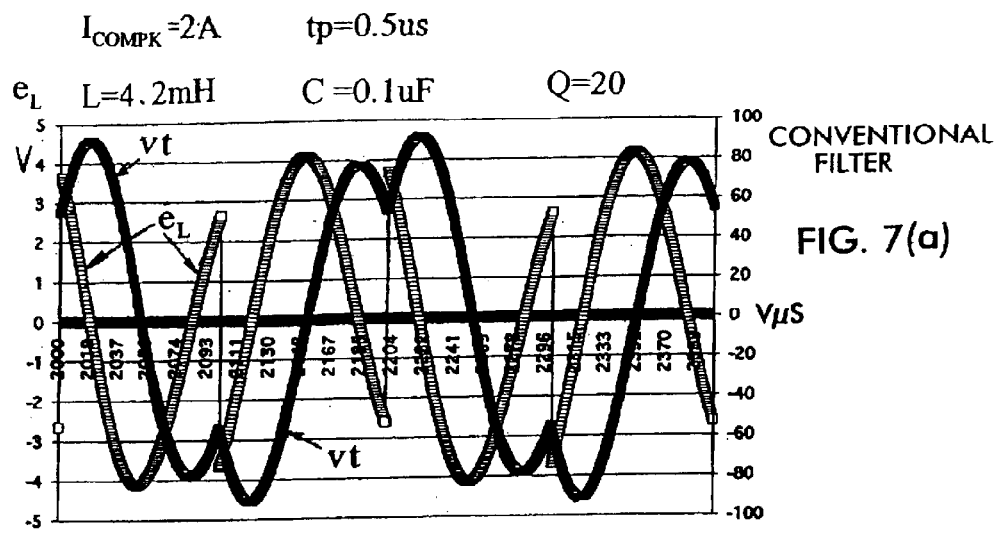
FIG. 7(a) CONVENTIONAL FILTER
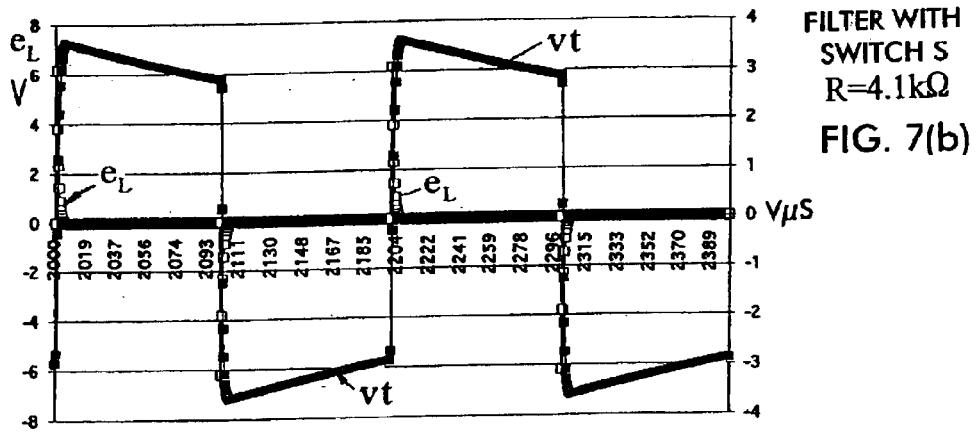
FIG. 7(b) FILTER WITH SWITCH S R=4.1kΩ
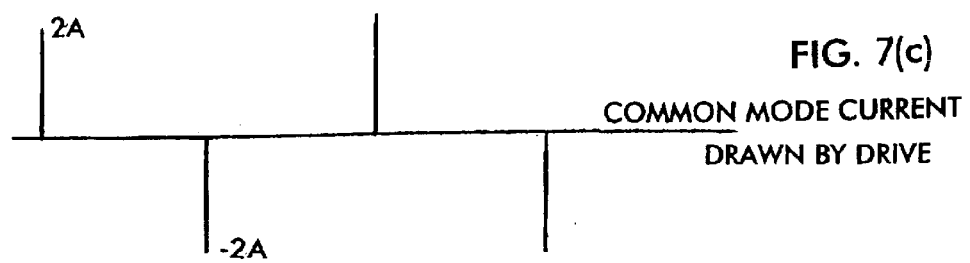
FIG. 7(c) COMMON MODE CURRENT DRAWN BY DRIVE
VOLTAGE, $e_L$ AND VOLT-SECONDS, $vt$, ACROSS COMMON-MODE INDUCTOR, FOR CONVENTIONAL PASSIVE FILTER, AND FOR FILTER WITH SWITCH S. FILTER DESIGNED FOR $I_{COMPK}$=2A. PWM FREQUENCY=5kHz

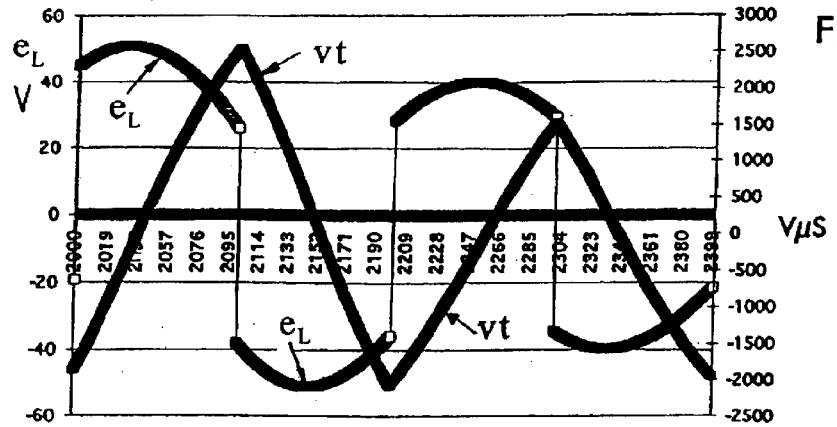
FIG. 8(a) CONVENTIONAL FILTER
$I_{COMPK}$=20A, tp=0.5us, PWM frequency =5kHz
L=42mH, C=0.1uF, Q=20
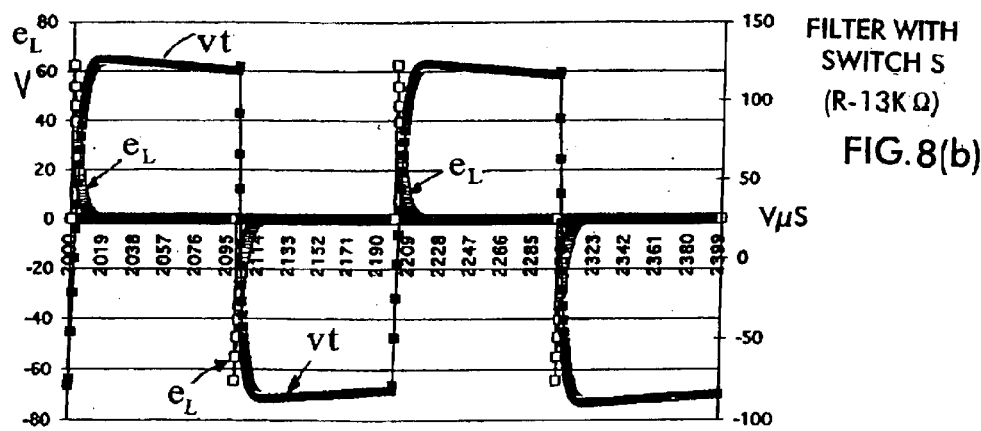
FIG. 8(b) FILTER WITH SWITCH S (R-13KΩ)
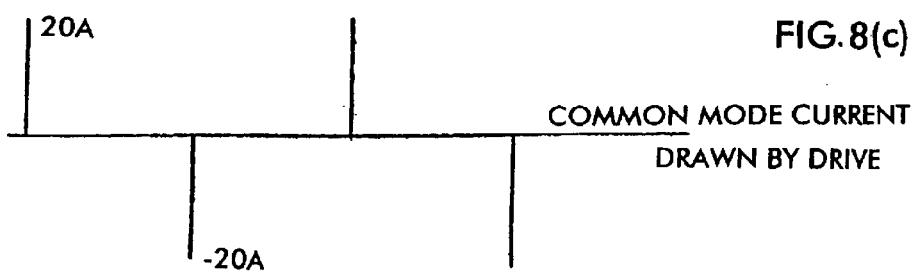
FIG. 8(c) COMMON MODE CURRENT DRAWN BY DRIVE
VOLTAGE, $e_L$, AND VOLT-SECONDS, $vt$, ACROSS COMMON-MODE INDUCTOR, FOR CONVENTIONAL PASSIVE FILTER, AND FOR FILTER WITH SWITCH S. FILTER DESIGNED FOR $I_{COMPK}$=20A. PWM FREQUENCY =5kHz

CONCEPTUAL CONTROL SCHEME FOR SWITCH S

PASSIVE COMMON MODE FILTER AND METHOD FOR OPERATING A PASSIVE COMMON MODE FILTER

BACKGROUND OF THE INVENTION

The present invention relates to a common mode filter for PWM motor drives and other types of power electronic equipment. A conventional passive common mode filter, illustrated schematically in FIG. 1, is undesirably large and expensive. This is particularly so for motor drives, where the amplitude of the common mode current and the corresponding size of the passive common mode filter increases with increasing length of the motor cable. For example, with a cable length of 100 meters, the size and cost of the passive common mode filter can be comparable to that of the PWM drive itself. With reference to FIG. 1, the common mode current pulses drawn by the PWM drive are shunted via filter capacitors designated Y-cap and blocked from the network by the common mode inductor L. As shown in FIG. 1, a conventional common mode filter employs a common mode inductor L having a typically toroidal core C having a winding wound on the core for each line, here L1 and L2. Each line is coupled to ground GND by a filter capacitor Y-cap. The common mode current drawn by the PWM drive or other equipment and flowing in the ground-line from the PWM drive is circulated through the Y-caps. The resulting common mode current thus does not appear on the lines L1 and L2 or the ground line GND as conducted EMI. In order to provide this filtering action, the capacitors and inductors are of substantial size and thus increase the size and cost of the equipment.

With reference to FIG. 1, undesired high frequency components of the common mode current drawn by the drive are shunted by the Y-caps. A typical maximum value for the Y-cap in an industrial drive is 0.1 uF. The value of the common mode inductance L is set by the frequency spectrum of the common mode current drawn by the drive, and the attenuation of conducted EMI that must be achieved at the input side of the filter. Although the circuit of FIG. 1 shows the filter in the AC line coupled to the PWM drive, the filter may also be disposed in, for example, the DC bus of a power converter, between the rectifier and the inverter.

The operation of the conventional passive filter is illustrated by the waveforms in FIG. 2, which show the calculated response of the filter to a given wave shape of common mode current drawn by the drive. The effect of the applied line voltage is substantially irrelevant to this discussion, and is ignored here. FIG. 2(a) shows the equivalent circuit and FIG. 2(b) shows the waveforms of the circuit of FIG. 1.

At t0, a first positive pulse of common mode current, of 5A amplitude and pulse width of 0.5 uS, is drawn by the drive. At the end of this current pulse, the voltage, ec, across the Y-cap has risen to above 16V. By time t1, when a negative pulse of common mode current is drawn by the drive, ec has already swung negative, due to resonant discharge through L, with corresponding current IL through L. The negative pulse of common mode current drawn by the drive at t1 now further increases the negative voltage on the Y-cap.

At t2, ec has swung back into the positive direction, and is now further boosted by the positive pulse of common mode current drawn by the drive at this time. After several cycles, the voltage ec and the current iL attain relative high "steady state" levels.

The build-up of voltage across the capacitor/inductor illustrated by the waveforms in FIG. 2 arises because the resonant frequency of the filter is close to the PWM switching frequency of the inverter of the PWM drive. Of course, the filter would normally be designed so that resonance or near-resonance at the PWM frequency is avoided.

A design where the resonant frequency of the filter is significantly higher than the PWM frequency is exemplified in FIG. 3, and one where it is significantly lower, in FIG. 4. As shown, in either case the inductor still has significant voltage applied during the periods between inverter switching events. (But note the scale change between these Figs. and FIG. 2).

The inductor must be sized to support the total voltage-time integral impressed across it. This voltage-time integral determines the maximum flux in the core. The required size (and cost) of the core are approximately proportional to this integral. The vast majority of the voltage-time integral is generated during intervals between inverter switching events, when common-mode current is not drawn by the drive. Thus the inductor has to handle a much greater voltage-time integral than is impressed just during the short conduction periods of the common mode current drawn by the drive.

A further undesirable feature of the conventional filter is that although the passive filter attenuates higher frequency components of common mode current, in the range above 150 kHz, it actually amplifies the lower frequency components that are related to the lower order harmonics of the PWM frequency.

SUMMARY OF THE INVENTION

The present invention provides a method for substantially reducing the size and cost of a conventional passive common mode filter, by using a switch in series with the "Y" capacitors of the common mode filter. This allows a reduction in the size of the core of the common mode inductor by up to an estimated 90–95%. The switch is controlled in synchronism with the inverter switching instants, so that the common mode voltage impressed by the Y-caps across the inductor during the periods between inverter switching instants is substantially eliminated by switching the capacitor out of the circuit except for during the time when common mode current is drawn by the equipment. This permits a very significant reduction in the size of the inductor.

The invention accordingly comprises an electromagnetic interference filter for filtering common mode current in an inverter device, the filter comprising an inductor coupled in a least one power supply line to the inverter device; the inverter device having a ground return line, a capacitor coupled between the inductor and the ground return line; and a controlled switch coupled in series with the capacitor between the inductor and ground return line, and a control unit controlled in accordance with commutations in said inverter device whereby said switch is turned on when common mode current is drawn by said inverter device and turned off when common mode current ceases substantially to be drawn by said inverter device.

The invention also comprises a method of filtering electromagnetic interference due to common mode current in an inverter device, the method comprising: switching common mode current pulses in a supply line including an inductor to the inverter device through a capacitor coupled between the supply line and a ground return line for the inverter device only when common mode current is drawn by the inverter device.

Other features and advantages of the present invention will become apparent from the following description of the invention which refers to the accompanying drawings.

BRIEF DESCRIPTION OF THE DRAWING(S)

FIG. 2(a) shows the simplified equivalent circuit of the circuit of FIG. 1 and

FIG. 2(b) show waveforms of FIG. 1;

Figure 1:
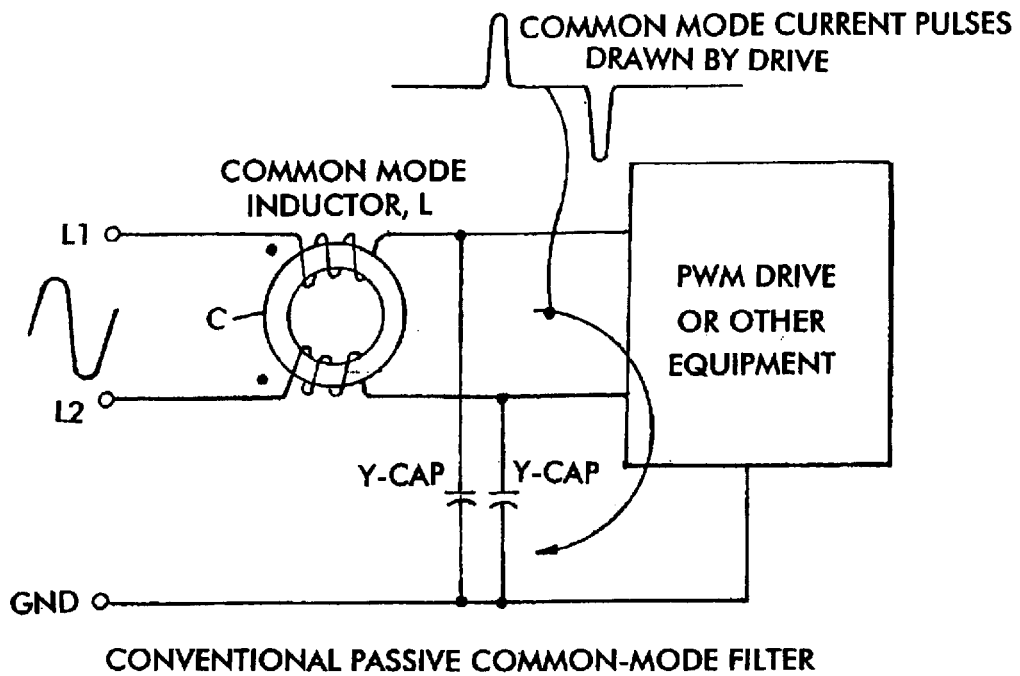
FIG. 1 is a schematic diagram of a conventional passive common-mode filter.
Figure 12:
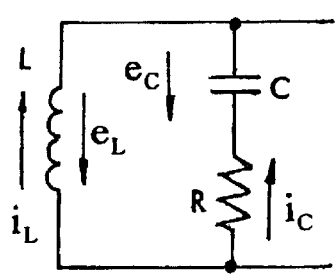
Figure 11:
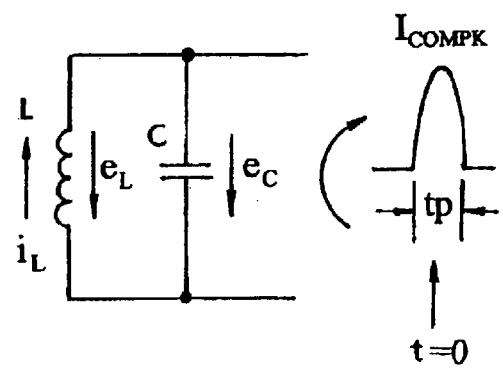
Figure 3:
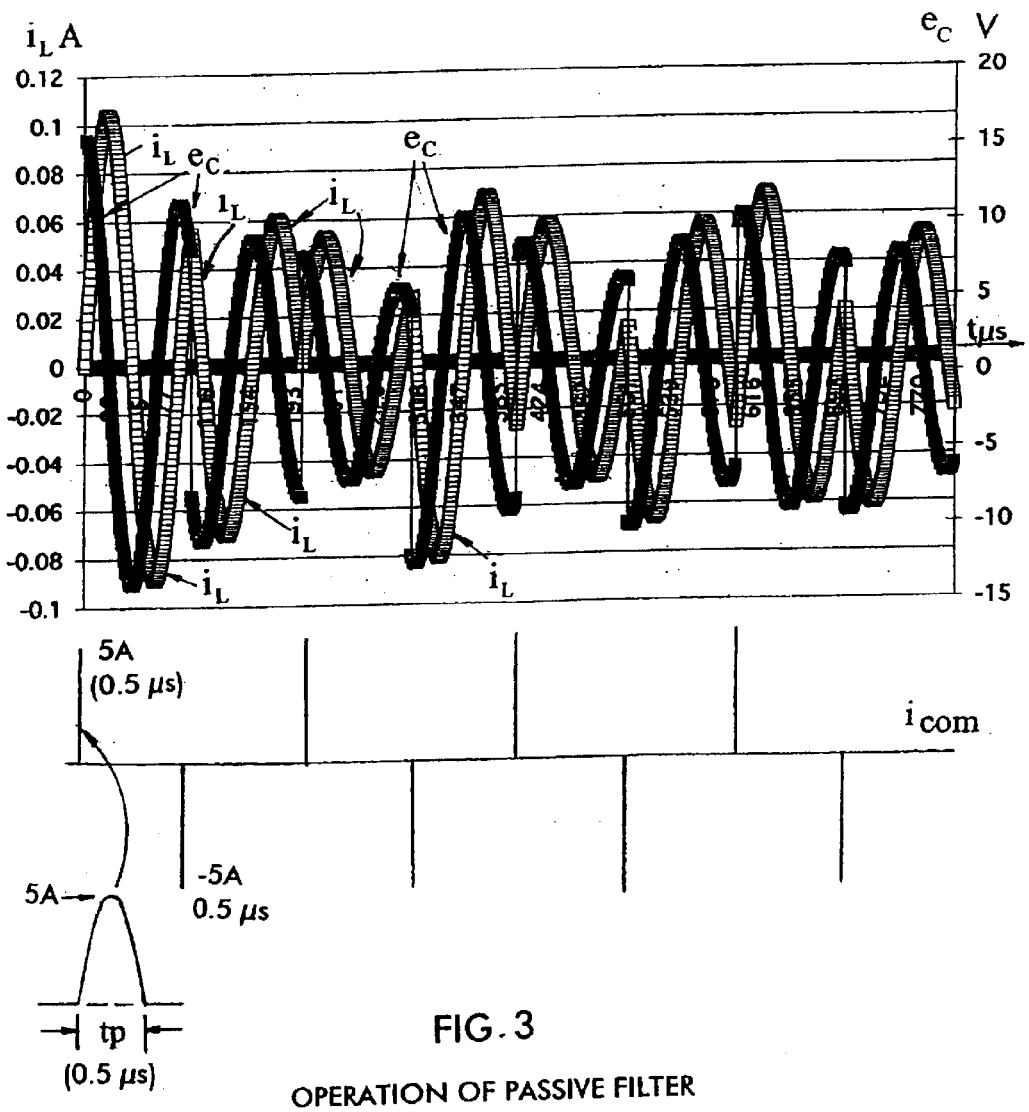
FIG. 3 shows waveforms for the circuit of FIG. 1 where the filter resonant frequency is about two times the PWM frequency.
Figure 4:
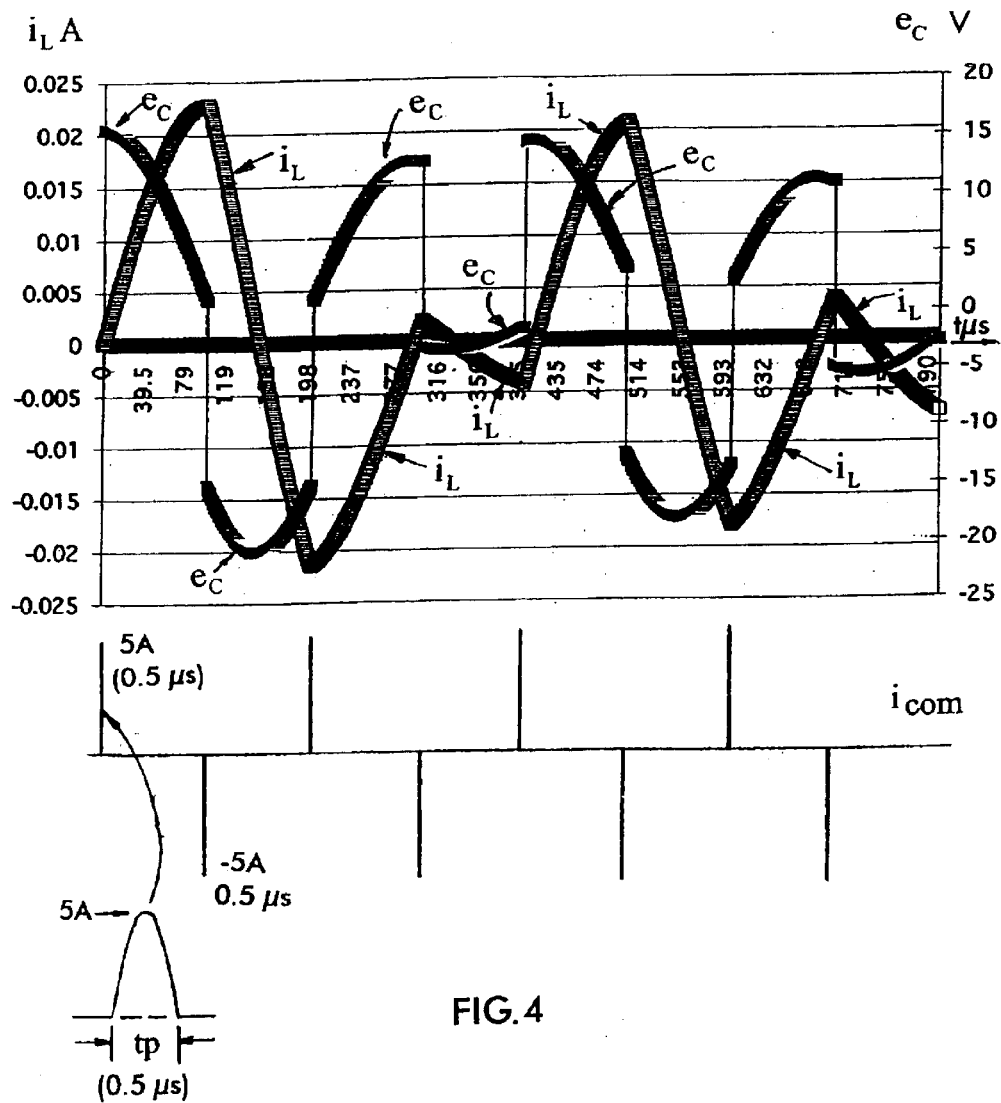
FIG. 4 shows waveforms of FIG. 1 wherein the resonant frequency of the passive filter filter is about one-half the PWM frequency.
Figure 9:
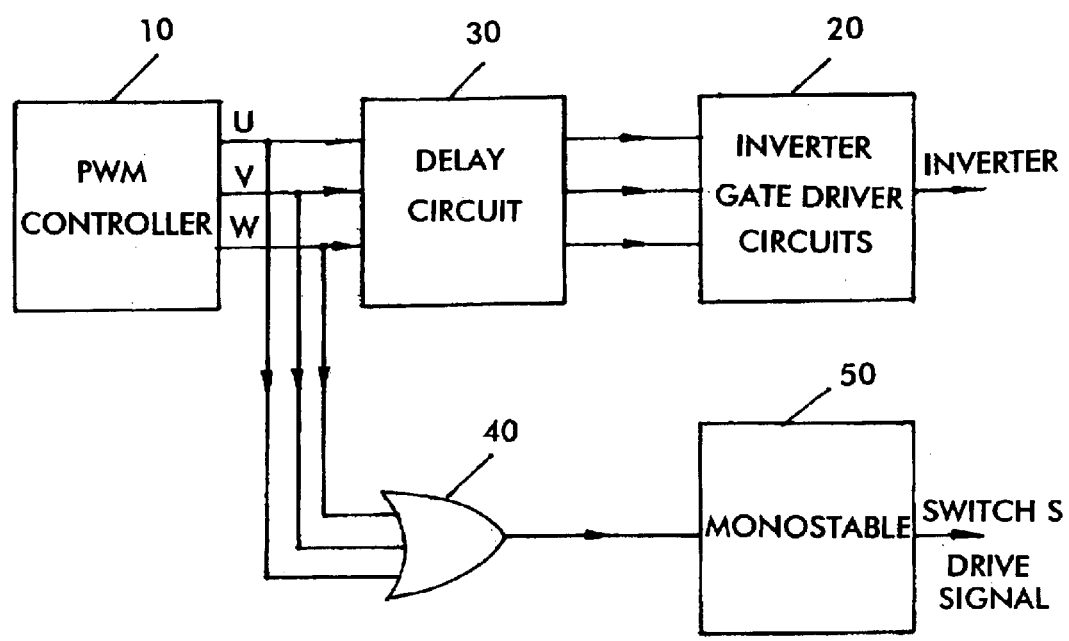
Figure 10:
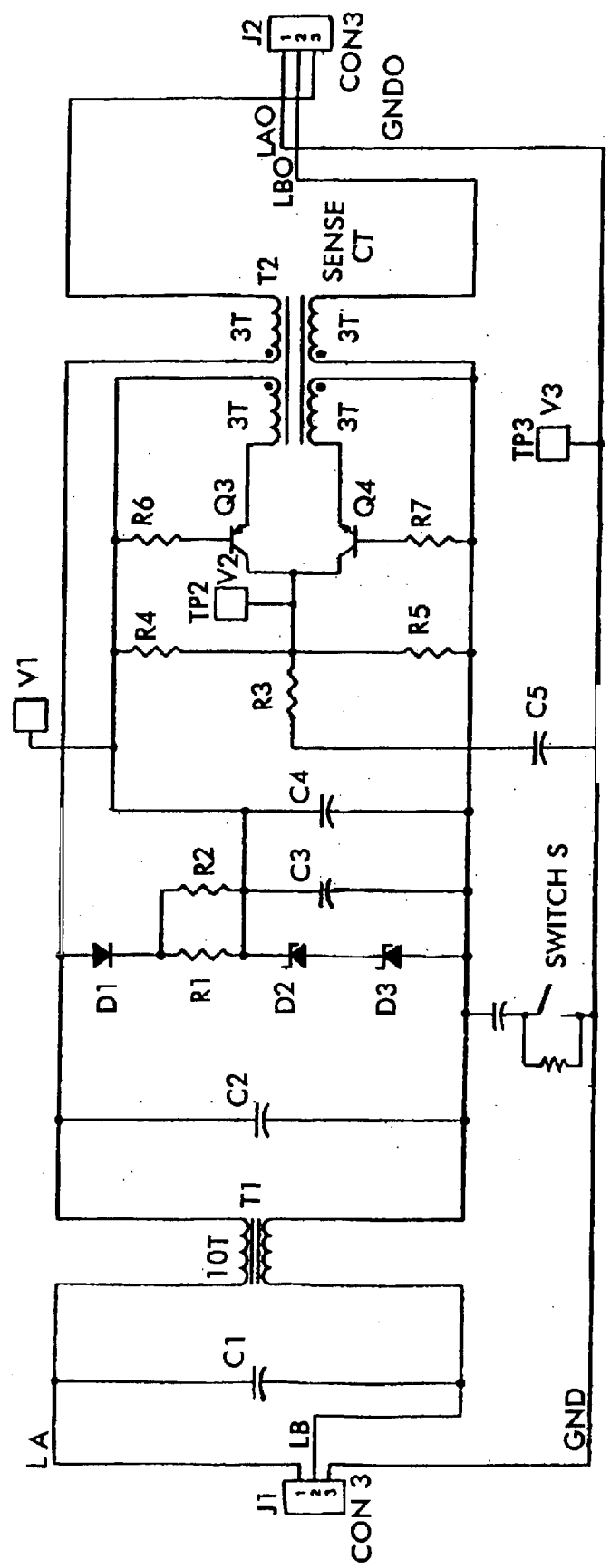
Figure 13A:
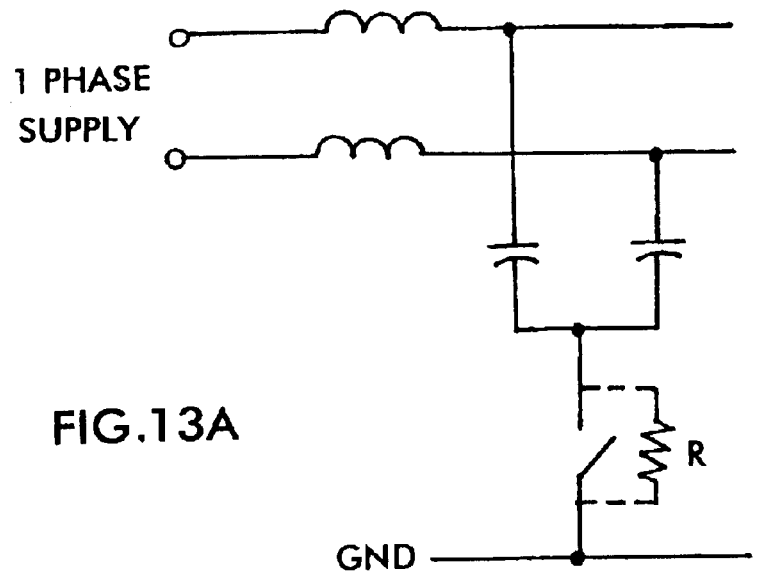
Figure 13B:
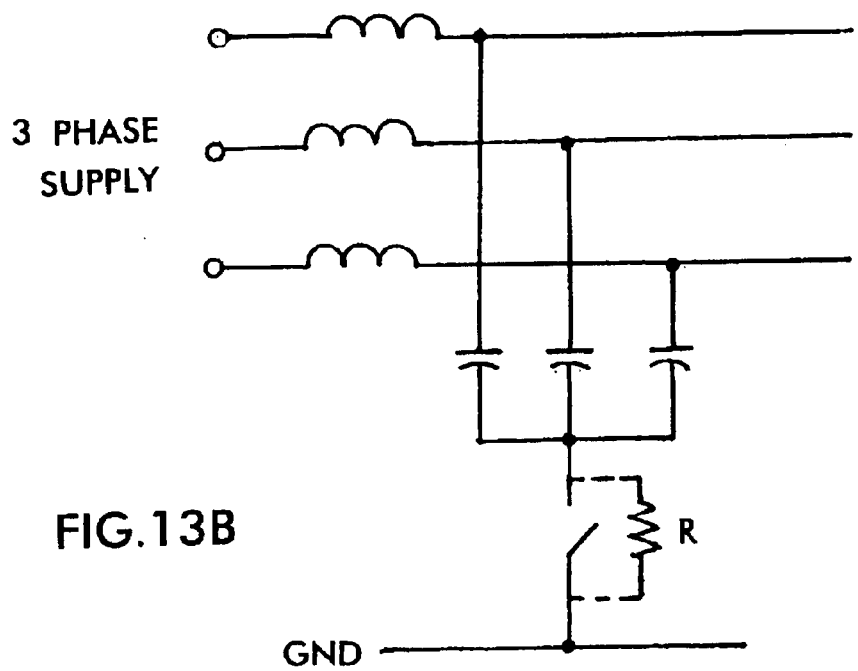

FIGS. 7(a), (b) and (c) show respectively, voltage and volt seconds Vt across the inductor in a conventional filter (FIG. 7(a)); and in a filter according to the invention (FIG. 7(b)); and the common mode current for a filter having a peak common mode current of 2A and PWM frequency of 5 KHz (FIG. 7(c));

FIGS. 8(a), (b) and (c) are waveforms similar to those of FIG. 7, but for a filter having a peak common mode current of 20A and PWM frequency of 5 KHz;

FIG. 9 is a block diagram of a control scheme for switch S of the filter of the invention;

FIG. 10 shows a circuit diagram of an active EMI filter with supplementary passive filter components according to the present invention;

FIG. 11 shows an equivalent circuit useful for calculations for the filtering interval of the filter of the invention;

FIG. 12 shows an equivalent circuit useful for calculations during the intervening period between commutations in the drive circuit; and FIGS. 13A and 13B show alternative arrangements of the switch S.

DETAILED DESCRIPTION OF EMBODIMENTS OF THE INVENTION

The principle of the invention is to isolate the inductor from the voltage across the capacitor during the periods between inverter switching events. This is done by inserting a solid state switch in series with each of the Y-caps, as shown in FIG. 5A.

The switch is closed in synchronism with the pulses of common mode current drawn by the drive, and open during the intervening periods. The Y-cap is in-circuit whenever a pulse of common mode current is drawn by the drive and must be bypassed by the capacitor; thus these current pulses still "see" the shunt capacitor and series blocking inductor.

During the intervening intervals, however, the switch, not the inductor, absorbs most of the voltage on the capacitor that was developed by the common mode current drawn by the drive. The integral of the common mode voltage developed across the inductor is thus much smaller, and the physical size of the common mode inductor can be very significantly reduced.

Figure 5A:
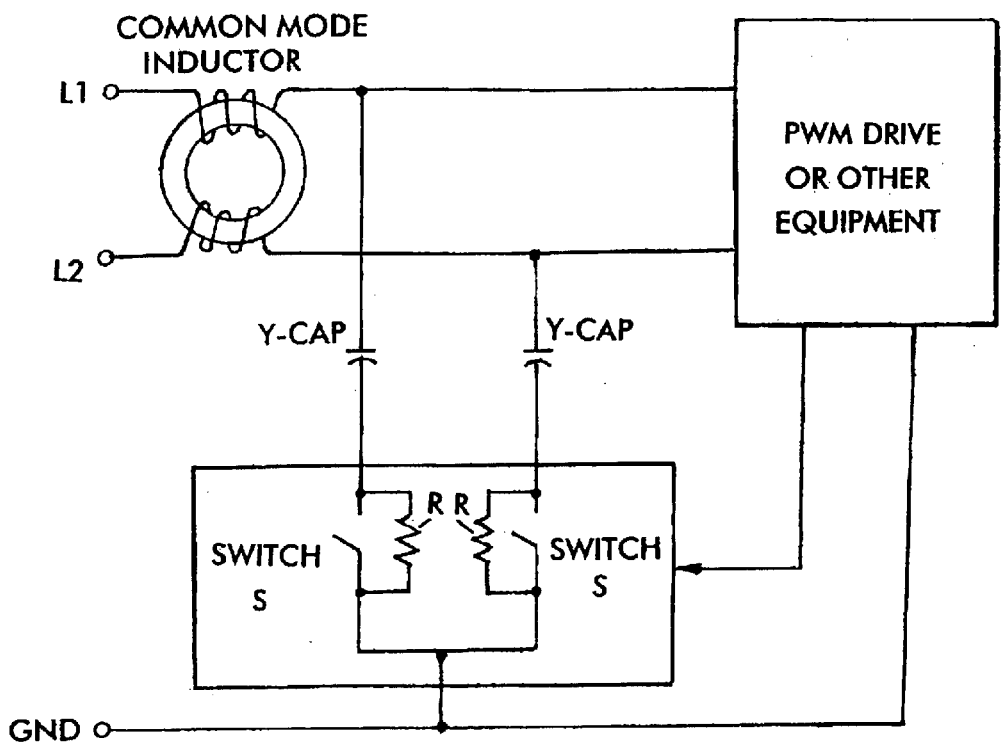
FIG. 5A show a simplified circuit diagram of a first embodiment of the invention.

The purpose of the parallel resistor R in FIG. 5A across each of the switches is to prevent significant voltage spikes when the switch is turned off, and to allow the voltage across the capacitor Y-cap to substantially track the input line voltage during the off periods of the switch.

Figure 5B:
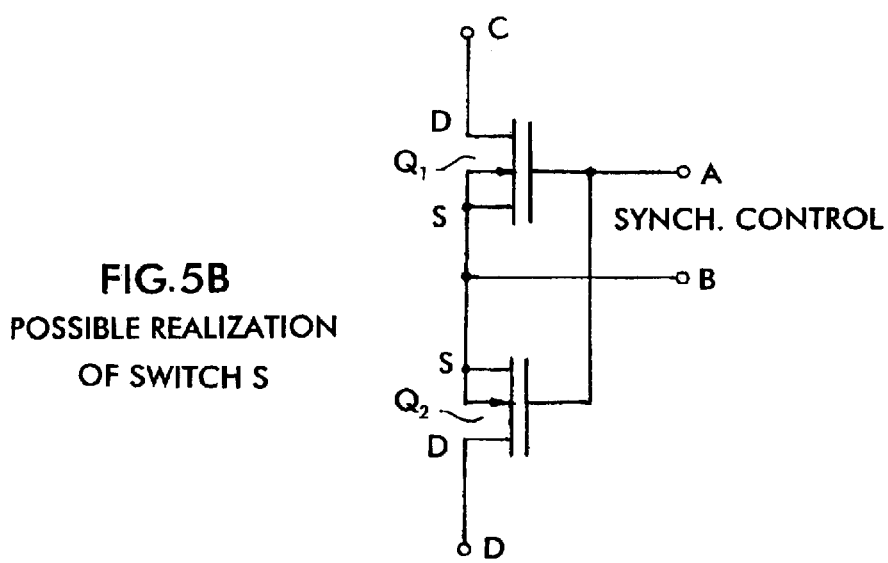
FIG. 5B shows one circuit implementation for each switch S of FIG. 5A.

FIG. 5B shows one implementation of each switch S comprising two MOSFETS Q1 and Q2 coupled in series with the synchronous on-off control coupled between terminals A and B. Terminals C and D are coupled in series with the Y-cap between the inductor L and ground.

FIGS. 13A and 13B show alternative arrangements in which one switch S is provided for all input lines. FIG. 13A shows a single phase arrangement and FIG. 13B shows an arrangement for a three phase network. In each case, a single switch S is provided to switch the common mode current.

The calculated waveforms in FIG. 6 illustrate the operation of the proposed scheme.

Figure 6A:
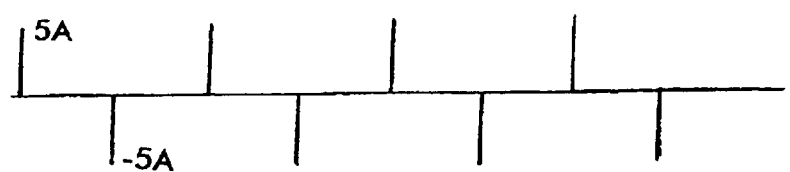
FIG. 6(a) shows the common mode current in the circuit of FIG. 5A.
Figure 6B:
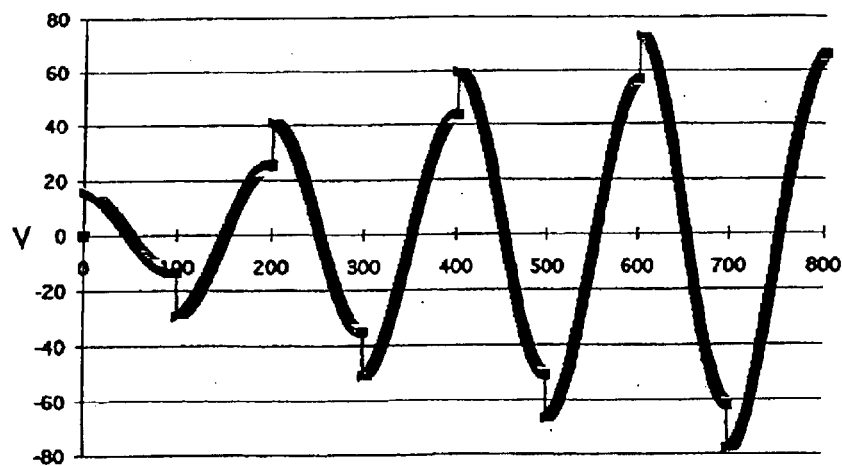
FIG. 6(b) shows the voltage across the inductor in a conventional passive filter.
Figure 6C:
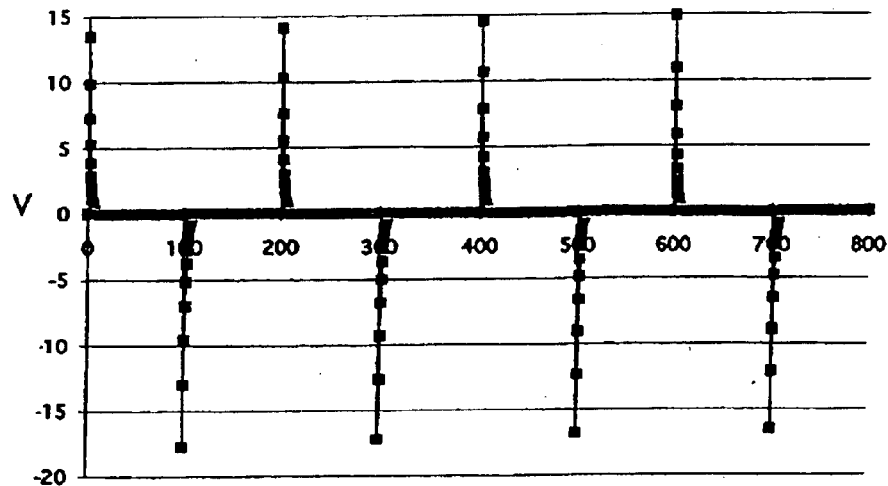
FIG. 6(c) shows the voltage across the inductor in the circuit of FIG. 5A.
Figure 6D:
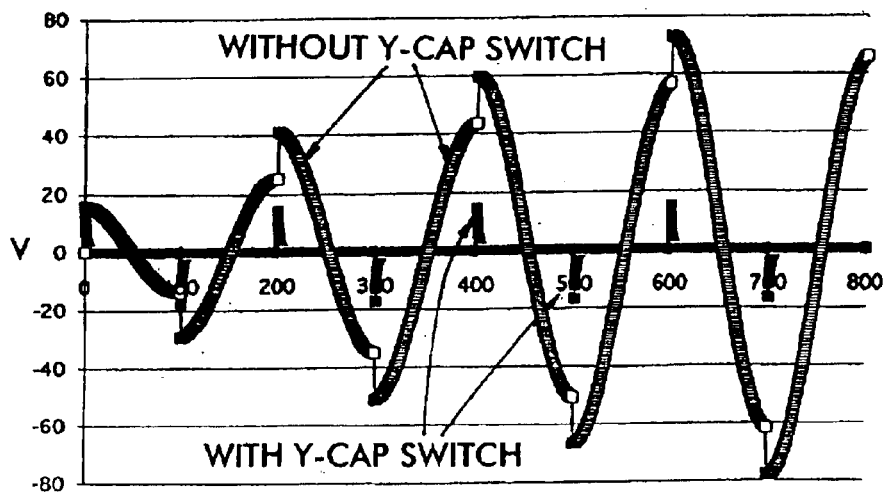
FIG. 6(d) shows the voltage across the inductor for the conventional circuit and the circuit of FIG. 5A.

FIG. 6(a) shows the pulses of common mode current drawn by the drive. FIG. 6(b) shows the voltage across the inductor for the conventional passive filter without the added switch. FIG. 6(c) shows the voltage across the inductor in the circuit with the added switch. Note the change of scale between FIGS. 6(b) and 6(c). The voltage across the inductor is considerably smaller in FIG. 6(c). FIG. 6(d) shows the voltages across the inductor, with and without the switch, on the same scale.

It is evident, with the switch added to the circuit, that the voltage-time integral impressed across the inductor is much smaller than without the added switch. In this example, the calculated voltage-time integral with the switch is only 0.5% of the value without the switch, indicating a possible theoretical 200:1 reduction in size of the common mode inductor.

For the example in FIG. 6, the resonant frequency of the filter is approximately equal to the PWM frequency. The component values are as follows: L=10.5 mH; Cy=0.1 uF; with $I_{COMPK}$=5A and tp=0.5 us. Actually, these component values would be impractical for the conventional passive filter by itself. Thus the above calculated 99.5% size reduction of the common mode inductor is optimistic, because it is based on a basic passive filter with an unacceptably large common mode inductor. However, the addition of the switch to this impractical passive design yields a completely practical design, in which the constraint that the resonant frequency of the filter must not coincide with the PWM frequency no longer applies.

Design examples, for passive components with resonant frequencies significantly above, and below, the PWM frequency, are illustrated by the calculated waveforms in FIGS. 7 and 8 respectively. In each of these examples (as for FIG. 6), the inductance values are calculated to provide the required attenuation of the common mode current above 150 kHz, for the stipulated waveform of unfiltered common mode current drawn by the drive. In FIG. 7, Cy=0.1 uf, L=4.2 mH, R=4.1 kΩ and $I_{compk}$=2A, tp=0.5 us and Q=20, $PWM_{freq}$=5 kHz. In FIG. 8, Cy=0.1 uF, L=42 mH, 42 mH, R=13 kΩ and $I_{compk}$=20A, tp=0.5 us and Q=20, $PWM_{freq}$=5 kHz.

The following tabulation shows the calculated voltage-time integrals, and the corresponding approximate relative sizes of the common mode inductor, for the examples in FIGS. 6 through 8.

| Fig. No. | IcomPK A | L mH | C uF | Vus without S | Vus with S | Approx relative size of L with S added |
|---|---|---|---|---|---|---|
| 7 | 2 | 4.2 | 0.1 | 90 | 3.5 | 4% |
| 6 | 5 | 10.5 | 0.1 | 3000 | 14 | 0.5% |
| 8 | 20 | 42 | 0.1 | 2500 | 120 | 5% |

The above calculated results indicate that, with the addition of the switch S, a practical reduction in size of the common mode inductor to 5% to 10% of the size needed for the conventional filter is attainable.

The waveforms depicted have been derived from the basic differential equations that define the operation of the circuit when the switch S is open and closed. The symbolic solution of these differential equations is given below.

An Excel spreadsheet has been used to substitute component values into these symbolic equations, and to calculate cycle-by-cycle operation. Initial conditions for each operating period are set to be equal to the final conditions of the previous period.

1. Filtering Interval
with reference to FIG. 11:

$$\frac{i_c}{pc} = i_L p^L \qquad i_C = (I_{compk} \sin\omega t - i_L) \qquad \omega = 2\pi \cdot \frac{0.5}{t_p}$$

$I_{compk} \sin \omega t - i_L = p^2 LC\, i_L$
$(p^2 LC+1)i_L = I_{compk} \sin \omega t$ $$CF: i_L = A\cos\omega_R t + B\sin\omega_R t \quad \omega_R = \frac{1}{\sqrt{LC}}$$

$$PI: i_L = \frac{i_{compk}\sin\omega t}{1 - \left(\frac{\omega}{\omega_R}\right)^2}$$

$$GS: i_L = A\cos\omega_R t + B\sin\omega_R t + \frac{I_{compk}\sin\omega t}{1 - \left(\frac{\omega}{\omega_R}\right)^2}$$

$$e_L = e_C = -A\omega_R L\sin\omega_R t + B\omega_R L\cos\omega_R t + \frac{I_{compk}\,\omega L\cos\omega t}{1 - \left(\frac{\omega}{\omega_R}\right)^2}$$

At t=o, $i_L = I_{L1}$
∴ $A = I_{L1}$ $$i_L = I_{L1}\cos\omega_R t + B\sin\omega_R t + \frac{I_{compk}\sin\omega t}{1 - \left(\frac{\omega}{\omega_R}\right)^2}$$

At t=o, $e_c = E_1$ $$\therefore E_1 = B\omega_R L + \frac{I_{compk}\omega L}{1 - \left(\frac{\omega}{\omega_R}\right)^2}$$

$$\therefore B = \frac{1}{\omega_R L}\left\{E_1 - \frac{I_{compk}\omega L}{1 - \left(\frac{\omega}{\omega_R}\right)^2}\right\}$$

2. Intervening Period Between Commutations
with reference to FIG. 12:

$$i_C\left(R + \frac{1}{pC}\right) = i_L pL = -i_C pL$$

$$-i_L\left(R + \frac{1}{pC}\right) = i_L pL$$

$(p^2 LC + pCR + 1)i_L = 0$ $$p = \frac{-CR \pm \sqrt{C^2 R^2 - 4LC}}{2LC}$$

$$p = -\frac{R}{2L} \pm \sqrt{\frac{R^2}{4L^2} - \frac{1}{LC}} = -a \pm b \qquad a = \frac{R}{2L} \qquad b = \sqrt{\frac{R^2}{4L^2}}$$

overdamped:

If $\frac{R^2}{4L^2} > \frac{1}{LC}$: $\quad i_L = Ae^{-(a-b)t} + Be^{-(a+b)t}$ underdamped:

If $\frac{R^2}{4L^2} > \frac{1}{LC}$: $\quad i_L = e^{-at}(L\cos(bt) + D\sin(bt))$ If underdamped: $e_L = Le^{-at}(-Cb\sin(bt)+Db\cos(bt)) - Lae^{-at}(C\cos(bt)+D\sin(bt))$
If overdamped: $e_L = L(A(a-b)e^{-(a-b)t} - B(a+b)e^{-(a+b)t}$ $e_C = e_L - i_C R$
$\phantom{e_C} = e_L + i_L R$ Find C and D for underdamped operation:
$i_L = e^{-at}(C\cos(bt)+D\sin(bt))$
When t=0 , $i_L = I_{L2}$ from previous period
∴ $C = I_{L2}$
When t=0 , $e_C = E_{C2}$ from previous period $e_C = e_L + i_L R$
$\phantom{e_C} = Le^{-at}(-I_{L2}b\sin(bt) + Db\cos(bt)) -$
$\phantom{e_C=} Lae^{-at}(I_{L2}\cos(bt) + D\sin(bt)) +$
$\phantom{e_C=} Re^{-at}(I_{L2}\cos(bt) + D\sin(bt))$ ∴ $Ec_2 = L\,Db - La\,I_{L2} + RI_{L2} + DbL - La\,I_{L2} + RI_{L2}$ $$D = \frac{1}{bL}\{E_{C2} + LaI_{L2} - RI_{L2}\}$$

Find A and B for overdamped operation:
$i_L = Ae^{-(a-b)t} + Be^{-(a+b)t}$
When t=o, $i_L = I_{L2}$ (from previous period)
∴ $I_{L2} = A + B$
$B = (I_{L2} - A)$
$i_L = Ae^{-(a-b)t} + (I_{L2} - A)e^{-(a+b)t}$
When t=0, $e_C = E_{C2}$ (from previous period)

$e_C = e_L + i_L R$
$\phantom{e_C} = L(-A(a-b)e^{-(a-b)t} - (I_{L2} - A)(a+b)e^{-(a-b)t}) +$ -continued $$R(Ae^{-(a-b)t} + (I_{L2} - A)e^{-(a+b)t})$$

$$\therefore E_{C2} = 2LAb - I_{L2}\,L(a+b) + RI_{L2}$$

$$A = \frac{E_{C2} + I_{L2}L(a+b) - RI_{L2}}{2Lb}$$

$B = (I_{L2} - A)$

FIG. 9 shows a block diagram of an embodiment of a control scheme for switch S for a three phase drive circuit. The PWM controller 10 and inverter gate drive circuits 20 of a typical drive circuit are shown. A delay circuit 30 couples the controller 10 and inverter drive circuits 20. The delay circuit 30 is introduced to provide a small delay to the driver circuit 20 in order to enable the switch S to respond approximately simultaneously or slightly in advance of the common mode current spike. An OR gate 40 receives the PWM output signals and outputs a signal when a commutation in any phase is to occur. A monostable or other pulse generator 50 produces a switch S drive signal of the required duration to turn the particular switch S on when a common mode pulse occurs and off when the common mode pulse terminates.

FIG. 10 shows the application of the invention to an active filter. The active filter includes a switching circuit including transistors Q3 and Q4 that cancels the common mode current through capacitor C5. The switch S is shown provided in only one of the lines, line 2, but can be provided in both lines 1 and 2. However, if the switch is bidirectional, one is sufficient. The common mode inductor L is shown. A current transformer CT is provided to activate the switches Q3 and Q4 of the active filter. Capacitor C5 feeds the common mode current from the ground line to the active switches Q3 and Q4 for cancellation. The circuit shown thus provides both active and passive common mode EMI filtering with the size of the passive filter inductor L reduced in accordance with the invention.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An electromagnetic interference filter for filtering common mode current in an inverter device, the filter comprising:
   a common mode inductor having a common core and at least two winding inductors wound on the common core, each in series with a respective supply line supplying power to the inverter device, the inverter device further having a separate ground return line;
   at least one capacitor coupled between each inductor and the ground return line; and
   a controlled switch coupled in series with the at least one capacitor between the inductor and ground return line; and
   a control unit controlled in accordance with commutations in said inverter device whereby said switch is turned on when common mode current is drawn by said inverter device and turned off when common mode current ceases substantially to be drawn by said inverter device.

2. The filter of claim 1, wherein a capacitor and controlled switch are coupled in series between each inductor and said ground return line.

3. The filter of claim 1, wherein a resistor is coupled across the switch to at least one of enable said capacitor to track an input line voltage when said switch is turned off and prevent significant voltage spikes when said switch is turned off.

4. The filter of claim 1, wherein said switch is turned off except for when common mode current is drawn by the inverter device.

5. The filter of claim 1, wherein the inverter device is a component of a PWM drive unit.

6. The filter of claim 5, when the PWM drive unit drives a motor.

7. The filter of claim 1, wherein the switch comprises a transistor.

8. The filter of claim 7, wherein the switch comprises a MOSFET.

9. The filter of claim 8, wherein the switch comprises two series connected MOSFETS.

10. The filter of claim 1, wherein the inductors are wound on a common core.

11. An electromagnetic interference filter for filtering common mode current in an inverter device, the filter comprising:
    an inductor coupled in a least one power supply line to the inverter device; the inverter device having a ground return line;
    a capacitor coupled between the inductor and the around return line; and
    a controlled switch coupled in series with the capacitor between the inductor and around return line; and
    a control unit controlled in accordance with commutations in said inverter device whereby said switch is turned on when common mode current is drawn by said inverter device and turned off when common mode current ceases substantially to be drawn by said inverter device;
    wherein the inverter device receives control signals from a controller for controlling commutations of the inverter, further comprising a delay circuit for delaying said control signals for a period of time to enable said switch to respond when a commutation occurs and said inverter device draws common mode current.

12. The filter of claim 11, wherein the control signals are supplied to a logic circuit so that a control signal for said switch is provided whenever a commutation occurs in the inverter device.

13. The filter of claim 12, further comprising a pulse shaping circuit coupled to said logic circuit for providing a control signal pulse of the required duration so that said switch is turned on during a duration of a pulse of common mode current.

14. The filter of claim 1, further comprising an active filter circuit for filtering said common mode current, whereby both active and passive common mode filtering is performed.

15. The filter of claim 1, wherein the at least one capacitor coupled to each inductor have a common connection point, said switch being connected between the common connection point and said ground return line.

16. A method of filtering electromagnetic interference due to common mode current in an inverter device, the method comprising:
    providing power to the inverter device on at least two power supply lines each having an inductor on a common core in series with the inverter device;
    switching common mode current pulses in the at least two supply lines supplying power to the inverter device through a capacitor coupled between each supply line and a separate ground return line for the inverter device only when common mode current is drawn by the inverter device.

17. The method of claim 16, further wherein the step of switching comprises providing a controlled switch in series with each said capacitor and switching said switch on when the inverter device draws common mode current and switching the switch off when a common mode current pulse terminates, whereby said switch is on only during the duration of a pulse of common mode current.

18. A method of filtering electromagnetic interference due to common mode current in an inverter device, the method comprising:

switching common mode current pulses in a supply line including an inductor to the inverter device through a capacitor coupled between the sunny line and a around return line for the inverter device only when common mode current is drawn by the inverter device;

further wherein the step of switching comprises providing a controlled switch in series with said capacitor and switching said switch on when the inverter device draws common mode current and switching the switch off when a common mode current pulse terminates, whereby said switch is on only during the duration of a pulse of common mode current;

further comprising providing a resistive shunt in parallel to said switch whereby said capacitor is able to track input line voltage when said controlled switch is off.

19. The method of claim 18, wherein said resistive shunt bypasses voltage spikes when the controlled switch is turned off.

20. The method of claim 16, wherein the inverter device is a component of a PWM drive device.

21. The method of claim 20, wherein the PWM drive device comprises a motor drive.

22. The method of claim 16, further comprising controlling said controlled switch with a control signal related to a control signal provided to said inverter device to control commutation of said inverter device whereby said controlled switch is turned on during a commutation in said inverter device to shunt a common mode current pulse between said supply line and said ground return line.

23. A method of filtering electromagnetic interference due to common mode current in an inverter device, the method comprising:

switching common mode current pulses in a supply line including an inductor to the inverter device through a capacitor coupled between the supply line and a ground return line for the inverter device only when common mode current is drawn by the inverter device;

further comprising controlling said controlled switch with a control signal related to a control signal provided to said inverter device to control commutation of said inverter device whereby said controlled switch is turned on during a commutation in said inverter device to shunt a common mode current pulse between said supply line and said ground return line;

further comprising delaying the control signal to commutate said inverter device thereby to allow said controlled switch to switch on substantially simultaneously or slightly before a common mode current pulse is drawn by said inverter device.

24. The method of claim 23, further comprising setting the duration of the control signal for said controlled switch so as to turn said switch off when said common mode current pulse substantially terminates.

25. The method of claim 17, further wherein a capacitor is provided coupled to an inductor provided in each supply line, and the step of switching comprises controlling a switch coupled in series with each capacitor.

26. The method of claim 16, further wherein the capacitors have a common connection, and the step of switching comprises switching a switch coupled to a common connection point of the capacitors.

* * * * *